(12) United States Patent
Solta

(10) Patent No.: US 7,278,337 B2
(45) Date of Patent: Oct. 9, 2007

(54) ACCELERATOR PEDAL MODULE

(75) Inventor: Rostislav Solta, Chrastava (CZ)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 10/734,214

(22) Filed: Dec. 15, 2003

(65) Prior Publication Data

US 2004/0149070 A1    Aug. 5, 2004

(30) Foreign Application Priority Data

Dec. 13, 2002    (DE) ................. 102 58 285

(51) Int. Cl.
*G05G 1/14* (2006.01)
(52) U.S. Cl. .......................... 74/513; 74/560
(58) Field of Classification Search ............... 74/512, 74/513, 514, 560
See application file for complete search history.

(56) References Cited

U.S. PATENT DOCUMENTS

| | | | | |
|---|---|---|---|---|
| 4,958,607 A | * | 9/1990 | Lundberg | ........... 123/399 |
| 5,241,936 A | | 9/1993 | Byler et al. | |
| 5,295,409 A | * | 3/1994 | Byram et al. | ........... 74/514 |
| 5,385,068 A | * | 1/1995 | White et al. | ........... 74/512 |
| 5,806,376 A | * | 9/1998 | Papenhagen et al. | ........... 74/513 |
| 5,934,152 A | * | 8/1999 | Aschoff et al. | ........... 74/513 |
| 6,658,963 B2 | * | 12/2003 | Yaddehige | ........... 74/512 |
| 6,689,016 B2 | * | 2/2004 | Apel | ........... 477/115 |
| 7,051,616 B2 | * | 5/2006 | Yokochi et al. | ........... 74/513 |
| 2002/0046616 A1 | | 4/2002 | Apel | |
| 2004/0149069 A1 | * | 8/2004 | Caba et al. | ........... 74/513 |

FOREIGN PATENT DOCUMENTS

| | | |
|---|---|---|
| DE | 195 31 735 C1 | 2/1997 |
| JP | 11-343882 A | 12/1999 |
| JP | 2000-136736 A | 5/2000 |
| JP | 2001-260696 A | 9/2001 |

* cited by examiner

*Primary Examiner*—Richard Ridley
*Assistant Examiner*—James Pilkington
(74) *Attorney, Agent, or Firm*—Ronald E. Greigg

(57) ABSTRACT

The invention relates to an accelerator pedal module for controlling the power of a driving engine having a pedal lever which is retained rotatably about a pivot axis on a bearing block and which actuates a sensor shaft of a rotation sensor, the sensor shaft being coaxial with the pivot axis. At least a part of the sensor shaft is directly supported rotatably in a bearing bore of a bearing region that is integral with the bearing block, of which bearing region at least a part of the radially outer circumferential surface forms at least one bearing face for the pedal lever.

10 Claims, 7 Drawing Sheets

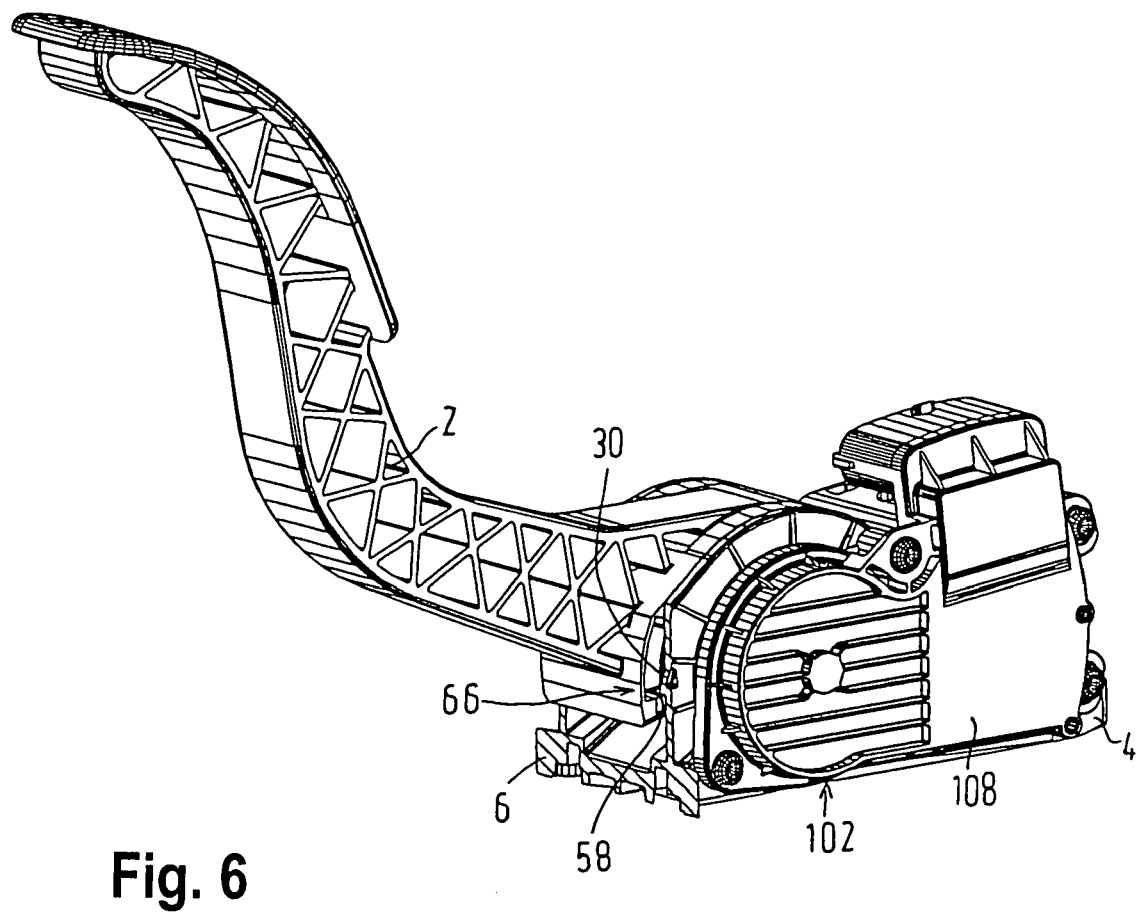
Fig. 6
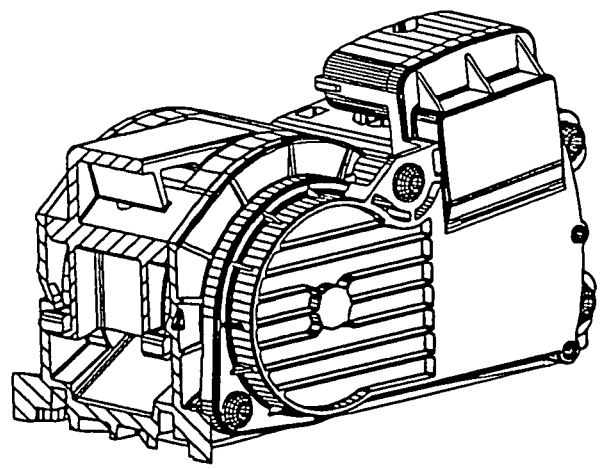

ACCELERATOR PEDAL MODULE

BACKGROUND OF THE INVENTION

1. Field of the Invention

The invention is directed to an improved accelerator pedal module for controlling the power of a driving engine, in particular an internal combustion engine of a vehicle, having a pedal lever which is retained rotatably about a pivot axis on a bearing block and which actuates a sensor shaft of a rotation sensor, the sensor shaft being coaxial with the pivot axis.

2. Description of the Prior Art

One known accelerator pedal module is described in German Patent DE 195 31 735 C1. In the known accelerator pedal, a transducer shaft of the rotation sensor is rotatably supported in a slide bush that is retained within a bearing bush. Loops of two cables are disposed in turn between the bearing bush and a radially inner circumferential wall of a bearing bore of the pedal lever and are coupled with reverse-tension springs that serve to restore the pedal lever to an idling position. However, this arrangement is complex and expensive to produce. Moreover, a number of parting seams subject to variation occur between the components inserted radially into one another, which adversely affects the rigidity of the bearing of the transducer shaft and hence also the measurement accuracy of the rotation sensor.

OBJECT AND SUMMARY OF THE INVENTION

According to the invention, it is proposed that at least a part of the sensor shaft be directly supported rotatably in a bearing bore of a bearing region that is integral with the bearing block, of which bearing region at least a part of the radially outer circumferential surface forms at least one bearing face for the pedal lever. The phrase "directly supported rotatably" is intended to mean a direct contact of the sensor shaft and the bearing bore, that is, without the interposition of bushes. Then, because only a single parting seam is present, a rigid rotational bearing is obtained, so that bearing errors and in particular angular errors of the sensor shaft are reduced. Since the sensor shaft represents the mechanical transmission member of the travel information, predetermined by the pedal lever, to the electrical part of the rotation sensor, this provision has a favorable effect on the measurement accuracy of the rotation sensor. Moreover, the rotational bearing of the sensor shaft can be manufactured simply and economically, because it comprises only two parts, namely the sensor shaft and the bearing region of the bearing block. Embodying the bearing region integrally with the bearing block also contributes to lowering production costs and increasing the rigidity of the bearing, because parting seams, which yield and tend to vary, are absent.

In a preferred way, the bearing region is formed by a hollow peg of the bearing block, the hollow peg being coaxial with the pivot axis. Because the hollow peg, by means of its bearing bore, furnishes a radially inner bearing face for directly bearing the sensor shaft and at the same time a radially outer bearing face for supporting the pedal lever, it advantageously performs a cost-saving dual function.

In a refinement, a plurality of partly cylindrical bearing faces of different diameter are embodied on the radially outer circumferential surface of the hollow peg, which are associated with complementary bearing faces of the pedal lever that are coaxial with the pivot axis and are partly cylindrical. Because of the graduated embodiment of the bearing faces, a lateral guidance of the pedal lever on the bearing block that is favorable in terms of the bearing rigidity is obtained.

In a preferred provision, a restoring spring system for restoring the pedal lever to an idling position tenses the bearing faces of the pedal lever against the bearing faces of the bearing block. As a result, a frictional moment acting counter to the actuation direction of the pedal lever is generated in the bearing faces and has a favorable effect on the road feel because of the actuation resistance. Because the restoring spring system at the same time takes over the retention function for retaining the pedal lever on the bearing block, the number of components of the accelerator pedal module is advantageously kept low.

A refinement provides that the pedal lever is guided between two cheeks that are integral with the bearing block. With this provision, besides the lateral guidance by the graduated bearing faces, an additional lateral guidance of the pedal lever on the bearing block is provided, further improving the rigidity of the bearing.

In an especially preferred way, the sensor shaft is rotationally coupled directly to the pedal lever by means of at least one driver protruding radially through a wall of the hollow peg; the driver is embodied integrally with either the pedal lever or the sensor shaft. Once again, this makes for an only small number of components.

In a refinement, one end of the sensor shaft is rotatably supported in the bearing bore of the hollow peg, and the other end of the sensor shaft is rotatably supported in a sensor housing that is fixed on the bearing block. Then the hollow peg of the bearing block has a slot, open toward the sensor housing, for the lateral introduction of the driver.

Preferably, the driver is formed by a driver pin, which is embraced with prestressing in a recess in the pedal lever or in the bearing block. This is realized for instance by providing that the recess is formed by a blind bore, whose cross section is slightly smaller than the cross section of the driver pin, and at least one side wall of the blind bore is elastically deformable upon introduction of the driver pin. Because of the prestressing, this connection is very rigid, resulting in a play-free transmission of the motion of the pedal lever to the sensor shaft. Because the restoring spring system for restoring the pedal lever tenses the bearing faces of the pedal lever against the bearing faces of the bearing block, the driver is also tensed in the radial direction into the receptacle at the same time, and because additional retaining and connecting elements between the driver and the pedal lever and between the driver and the bearing block are dispensed with, the effort and expense of assembly are greatly reduced.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 6 is a fragmentary sectional view taken along the line VI-VI in FIG. 4.

DESCRIPTION OF THE PREFERRED EMBODIMENTS

The accelerator pedal module of the invention is used for controlling a driving engine, preferably an internal combustion engine of a motor vehicle, whose throttle valve is adjustable by a control motor. In that case, the accelerator pedal module serves to generate electrical signals for the control motor, so that the engine power can be controlled as a function of the position of an accelerator pedal of the accelerator pedal module. However, the driving engine can also for instance be an electric motor that is triggered by electrical signals.

Figure 1:
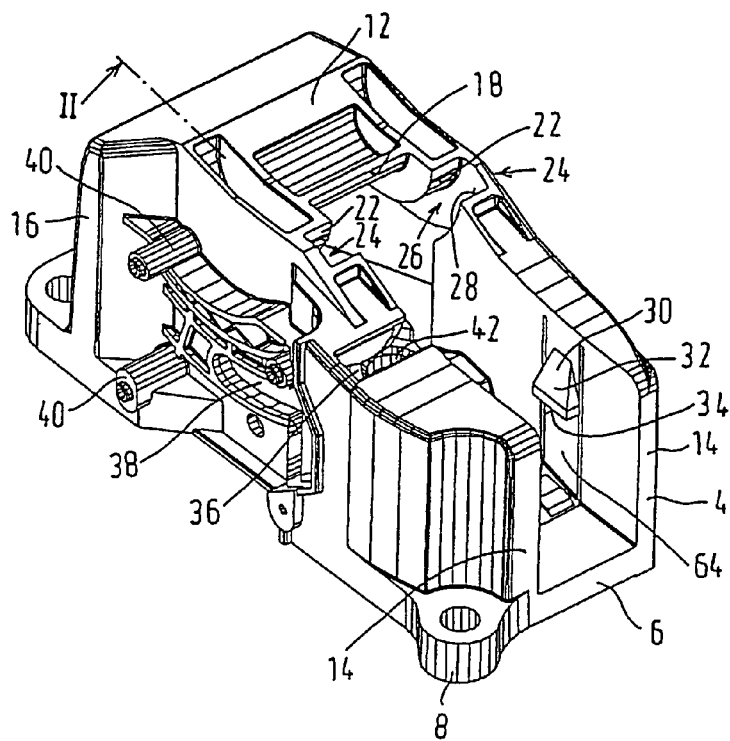
FIG. 1 is a perspective view of a pedal lever and a bearing block, as essential parts of a preferred embodiment of an accelerator pedal module according to the invention.
Figure 1:
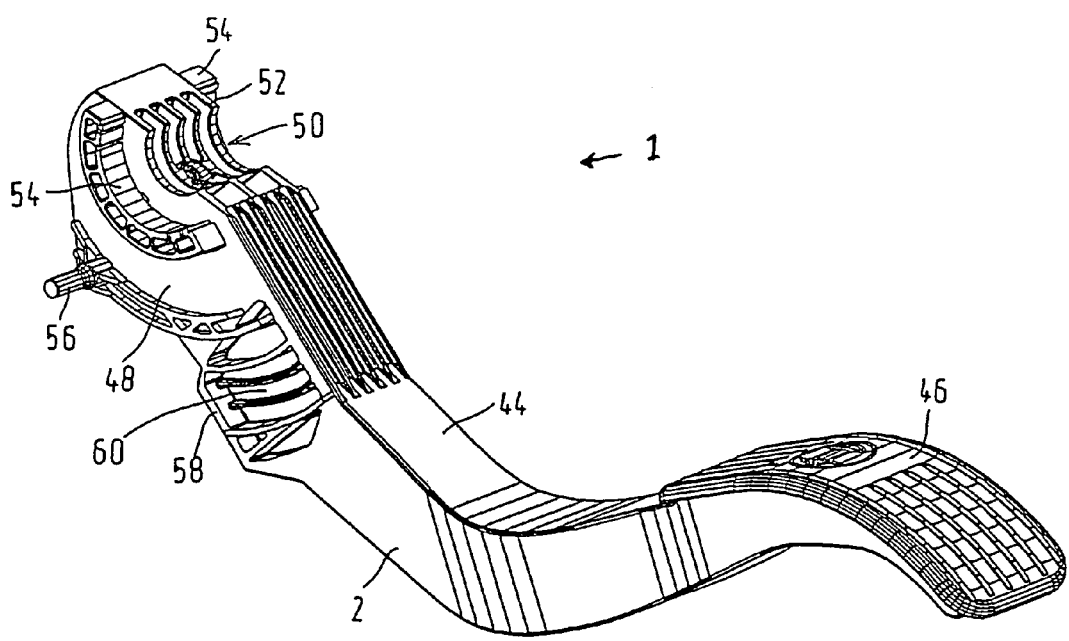

The accelerator pedal module 1 is foot-actuated by the motor vehicle's driver and as shown in FIG. 1 includes a pedal lever 2, which preferably is the gas pedal actuated directly by the driver's foot. Alternatively, the pedal lever 2 can be a lever of a lever mechanism or rod linkage mechanism that includes additional levers and is coupled to the gas pedal. The accelerator pedal module 1 also includes a bearing block 4 as a retention structure for the pedal lever 2, and this block can preferably be secured directly in the foot area of the driver by means of screw eyes 8 protruding laterally from a bottom plate 6 of the bearing block. Further elements contained in the accelerator pedal module 1 are a sensor and restoring spring elements, not shown in FIG. 1 for the sake of simplicity. In addition, the accelerator pedal module 1 can be provided with a kick-down mechanism for an automatic transmission of the motor vehicle, a mechanism as described for instance in German Patent Disclosure DE 195 36 699 A1.

As can be seen from the upper part of FIG. 1, the bearing block 4 includes two cheeks 14, joined together, at the ends pointing away from the bottom plate 6, by a crossbar 12, which cheeks are disposed parallel with transverse spacing and protrude at a right angle away from the bottom plate 6. The cheeks 14 are also joined to one another by means of an end plate 16 that likewise protrudes away from the bottom plate 6 at a right angle. The crossbar 12, on its lower face pointing toward the bottom plate 6, has a central bearing face 18, in the form of an approximately semicylindrical face of an imaginary cylinder, whose center axis corresponds to a pivot axis 20, shown in FIG. 2, of a pivot connection between the pedal lever 2 and the bearing block 4. Toward the cheeks, the crossbar 12 also has two bearing faces 22, which are enlarged in diameter compared to the central bearing face 18 and are likewise formed approximately by semicylindrical faces. All the bearing faces 18, 22 point toward the bottom plate 6 of the bearing block 4. Transversely to the pivot axis 20, that is, viewed longitudinally of the bearing block 4, there is, next to each edge of the bearing faces 22 of the cheeks, a respective introduction slot 24 leading to a respective annular groove 26, which is defined on one side by the larger-diameter bearing face 22 and on the other by a further, opposed, circular-arclike bearing face 28 that is coaxial with the pivot axis 20.

In a region of the cheeks 14 located at a distance from the bearing faces 18, 22, 28, there are two bearing block stops, opposite one another and pointing toward one another and protruding in the direction of the pivot axis 20, which are preferably in the form of wedges 30, with wedge faces 32, extending approximately radially to the pivot axis 20, that on their maximally protruding wedge end each form one protruding step 34 relative to the rest of the cheek surface. Because of the perspective view, only one of the wedges 30 can be seen in FIG. 1. In one of the cheeks 14 of the bearing block, there is also a further introduction slot 36, which opens into a partially circular-arclike opening 38 of the corresponding cheek 14. Adjacent to the partially circular opening 38 in the cheek 14, there is a holder for a sensor housing of the sensor, preferably in the form of pegs 40 which protrude outward at a right angle and have central blind bores for receiving screws.

Figure 2:
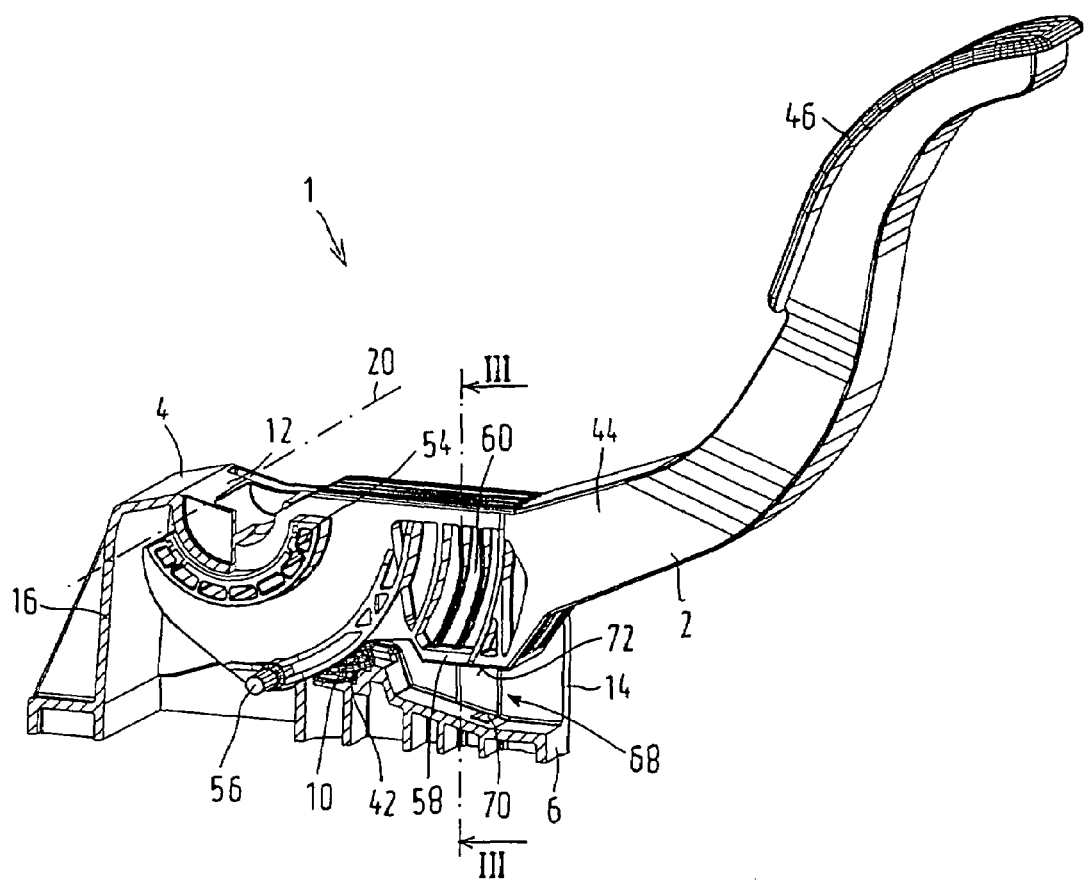
FIG. 2 is a perspective view of the pedal lever mounted on the bearing block, the bearing block being shown in a section taken along the line II-II in FIG. 1.

As can be best seen from FIG. 2, the bottom plate 6, in a region that in terms of the longitudinal direction of the bearing block 4 is located between the pivot axis 20 and the bearing block stops 30 (shown in FIG. 1), there is a holder for the restoring spring elements 10, which is preferably embodied as a peg 42. The restoring spring elements, embodied for instance as helical springs inserted one inside the other, are slipped onto the peg 42 and centered on it. The bearing block 4 is preferably embodied as a one-piece plastic injection-molded part; that is, all the elements described thus far, such as the bottom plate 6, end plate 16, cheeks 14, crossbar 12, and in particular the bearing block stops 30, together form one integral component.

The pedal lever 2 shown in the lower part of FIG. 1 has a lever body 44, which on its free end has a foot plate 46 and, on a pedal lever head 48, it has bearing faces, which cooperate with the bearing faces 18, 22, 28 of the bearing block 4 and contain a central, concave bearing face 50. The bearing face 50 is preferably formed by a number of ribs 52, parallel to one another with transverse spacing, whose end faces together form approximately a semicylindrical surface with a diameter that is approximately equivalent to the diameter of the central bearing face 18 of the bearing block 4. The central bearing face 50 of the pedal lever 2 is disposed between coaxial annular portions 54, which protrude away from both side faces of the lever body 44 and each extend over approximately a semicircular arc, and whose radially inner circumferential surfaces form bearing faces. The annular portions 54, in a direction that is radial to the pivot axis 20, have a thickness which is equivalent to the inside diameter of the annular groove 26 of the bearing block 4.

A peglike driver 56 also protrudes transversely outward away from the pedal lever head 48 and for instance engages a rotary lever, not shown, of a wiper ring of a potentiometer retained in the sensor housing; in the present case, the potentiometer for instance forms the sensor. In a region of the lever body disposed between the bearing faces 50, 54 and the foot plate 46, a pedal lever stop is present on each of the two side faces, preferably in the form of a stop edge 58, which defines a region 60 that is retracted in the direction of the pivot axis 20. The retracted region 60 has a dimension longitudinally that is approximately equivalent to the actuation travel of the pedal lever 2 and that extends approximately radially relative to the pivot axis 20. The width of the pedal lever 2 in the area surrounding the retracted region 60 is approximately equivalent to the transverse spacing of the two cheeks 14 of the bearing block 4. The pedal lever 2 is preferably embodied as a one-piece plastic injection-molded part; that is, all the elements described thus far, such as the foot plate 46, the bearing faces 50, 54, the driver 56, the retracted regions 60, and in particular the pedal lever stops 58 together form one integral component.

For producing the pivot connection between the pedal lever 2 and the bearing block 4, the annular portions 54 that are present on the pedal lever head 48 are introduced via the introduction slots 24 into the associated annular grooves 26, and the driver 56 is introduced into the further introduction slot 36. The pedal lever 2 is then rotated onward by some distance relative to the bearing block 4, or vice versa, about the pivot axis 20, as a result of which both the central and the outer bearing faces 18 and 50, and 22, 28 and 54, respectively, on the pedal lever 2 and on the bearing block 4, and the side faces on the pedal lever 2 and on the cheeks 14 of the bearing block 4 all come into sliding contact with one another. The result is a positive engagement, which permits a rotation of the pedal lever 2 only relative to the bearing block 4 about the pivot axis 20; particularly because of the two pairs 26, 54 of annular portions and annular grooves, the pedal lever 2 is guided in compulsory fashion and braced. Before that, the restoring spring elements 10 are placed on the one hand on the peg 42 in the bottom plate 6 of the bearing block 4 and on the other on a peg of the pedal lever 2 opposite it in the mounting position, the latter peg not being visible in the drawings.

Figure 3:
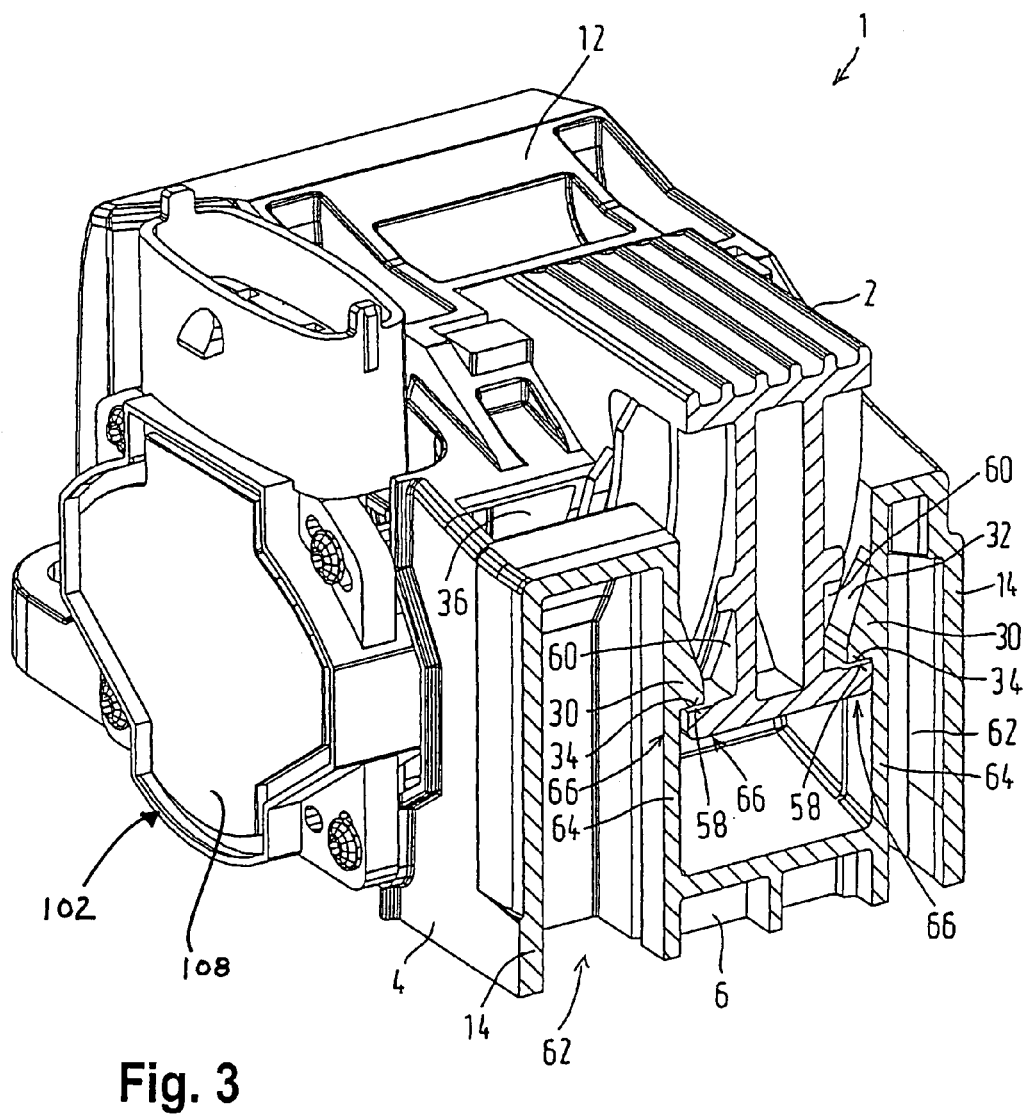
FIG. 3 is a sectional view of the accelerator pedal module taken along the line III-III of FIG. 2.

In general, in the region of the pedal lever stop 58 and/or the bearing block stop 30, there are elasticities such that during the relative rotary motion, executed about the pivot axis 20, between the pedal lever 2 and the bearing block 4 to establish the pivot connection, the pedal lever stop 58 slides past the bearing block stop 30 as a result of elastic deformations and after springing back engages the bearing block stop from behind. Since in the present case the width of the pedal lever 2 is approximately equivalent to the spacing of the two cheeks 14, and the wedges 30, functioning as bearing block stops, must be passed by the stop edges 58 of the pedal lever in the course of the relative rotation in order to establish the pivot connection, the walls of the cheeks 14 are double in the region of the wedges 30, and therefore have hollow spaces 62, as shown in FIG. 3. Thin strips 64, which are separated by slots from the rest of the wall, are also formed onto the wedges 30. As a result, because of elastic deformations of the strips 64, the wedges 30 can escape back into the hollow spaces 62, when the stop edges 58 slide along the wedge faces 32 that gradually widen in the direction of the relative rotary motion that is intended to establish the pivot connection. Consequently, the elastic deformation of the cheeks 14 takes place primarily in the locally defined region of the strips 64, far from the bearing faces 18, 22, 28, and 50, 54, respectively, of the pivot connection.

Since the pedal lever 2 is guided in compulsory fashion on the bearing block 4, particularly by the pairs 26, 54 of annular portions and annular grooves, and cannot execute any other motion than a rotation about the pivot axis 20, it is advantageously braced and cannot deflect in other directions. The part that comes into engagement first with the annular grooves 26 during the insertion of the annular portions 54 of the pedal lever 2 into the introduction slots 24 of the bearing block 4 consequently functions initially as a compulsory guide to facilitate assembly in the overcoming of the forces dictated by the elastic deformations. Consequently, the pedal lever 2 is already braced on the bearing block 4 by means of the bearing faces 18, 22, 28, and 50, 54, respectively, of the pivot connection before the pedal lever stops 58 slide past the bearing block stops 30.

Instead of embodying only those regions formed onto the wedges 30 elastically, the wedges 30 themselves and/or the stop edges 58 could also be embodied elastically. The only decisive factor is that the wedges 30 and stop edges be capable of moving past one another. For instance, spring-prestressed wedges 30 guided in the cheeks 14 and embodied as separate components are also conceivable.

Once the stop edges 58 have moved completely past the wedges 30 in the course of the further relative rotation, the wedges 30 emerge again from the hollow spaces 62 from springing back of the strips 64, and—in a manner similar to a snap closure—the steps 34 on the ends of the wedges 30 engage the associated stop edges 58 from behind, and the wedges 30 protrude with play into the laterally retracted regions 60, as shown in FIG. 3. Thus the pivot connection between the pedal lever 2 and the bearing block 4 is completed, and the pedal lever 2 can execute the requisite pivoting motions without hindrance. The restoring spring elements 10 are pressed together during the relative rotary motion completed in the direction of the closing snap closure and exert a restoring force on the pedal lever 2. Once the snap connection has been completed, the steps 34 of the wedges 30 consequently strike the stop edges 58 in the opposite direction of rotation and assure a positive engagement, which prevents the stop edges 58 from moving past the protruding steps 34 of the wedges 30 again and undoing the pivot connection that has once been made; this can easily be seen, particularly from the sectional view in FIG. 3. The snap closure consequently forms one component of the pivot connection, without which the pivot connection could not be completed. If necessary, however, the pivot connection or snap closure can be undone again by spreading the two cheeks 14 of the bearing block apart, although in that case a suitable tool is needed. In the completely installed state, the pedal lever stop 58 is consequently prestressed resiliently against the bearing block stop 30 counter to a pedal actuation direction, and the pedal lever stop 58 and the bearing block stop 30 together form an idling stop 66 of the accelerator pedal module 1, so that the pedal lever 2 is in the idling position, in the position shown in FIG. 3.

A full-load stop 68 of the accelerator pedal module 1 has a plane portion 70 of the bottom plate 6, toward the bearing block 4, which is opposite a portion 72 of the pedal lever 2 that projects slightly downward; the portion 70 contacts the portion 72 when the pedal lever 2 has been fully depressed, as can easily be understood from FIG. 2. The retracted regions 60 of the pedal lever have a length, viewed in the circumferential direction of the rotary motion, which encompasses the entire pedal lever motion between the idling stop 66 and the full-load stop 68. Moreover, by actuation of the pedal lever 2, the driver 56 is moved along the partly circular-arclike opening 38 of the cheek 14 of the bearing block 4 and in the course of this motion carries the rotary lever of the wiper ring of the potentiometer with it, whereupon the potentiometer generates electrical signals for the engine control unit that are dependent on the pedal actuation travel.

From the above explanation, it is clear that the pivot connection between the pedal lever 2 and the bearing block 4 comes about by means of a single rotary motion about a pivot axis 20, and this pivoting motion simultaneously furnishes the snap closure that functions simultaneously as an idling stop 66.

Figure 4:
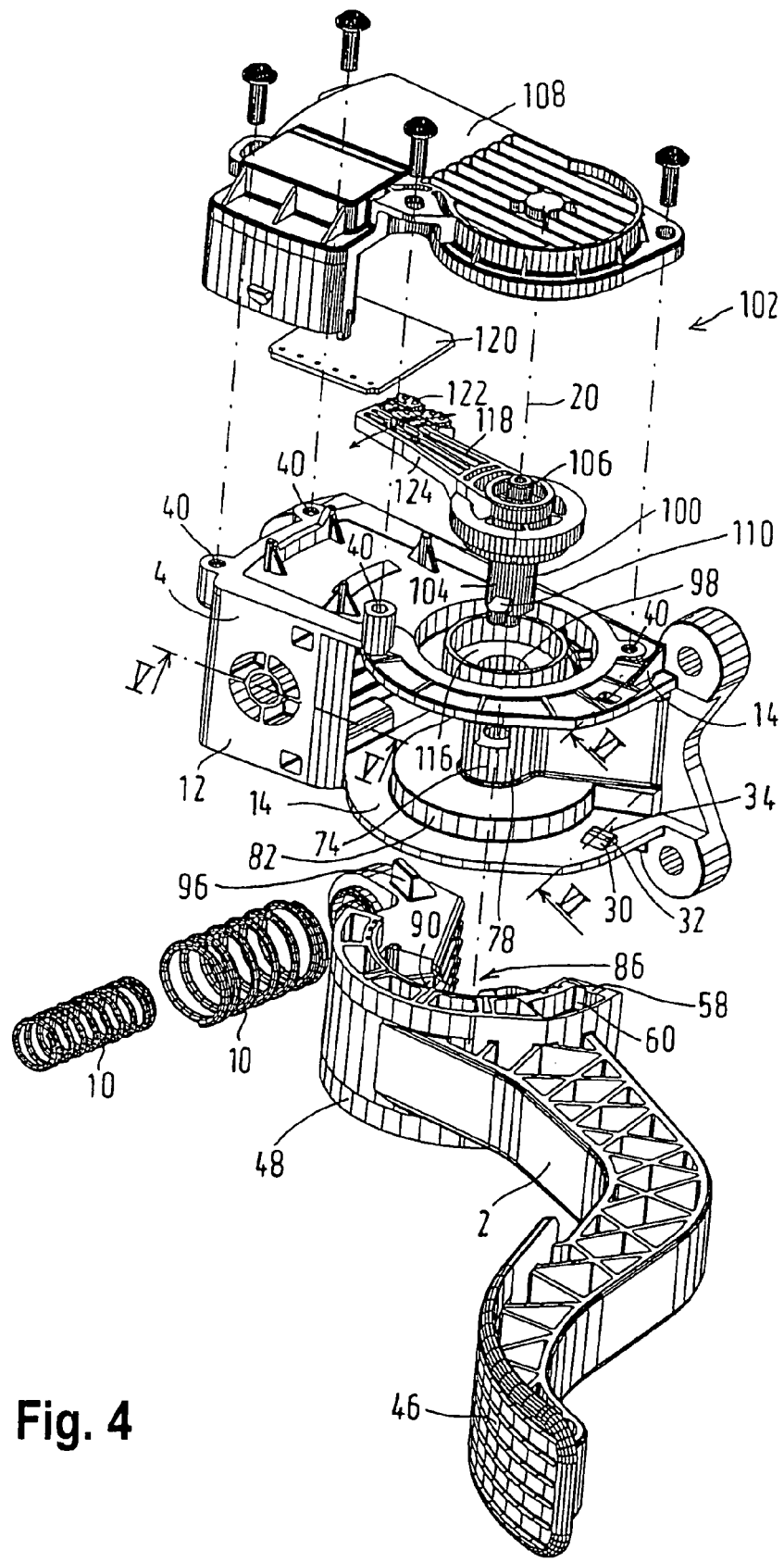
FIG. 4 is an exploded view of a further embodiment of the accelerator pedal module.
Figure 5:
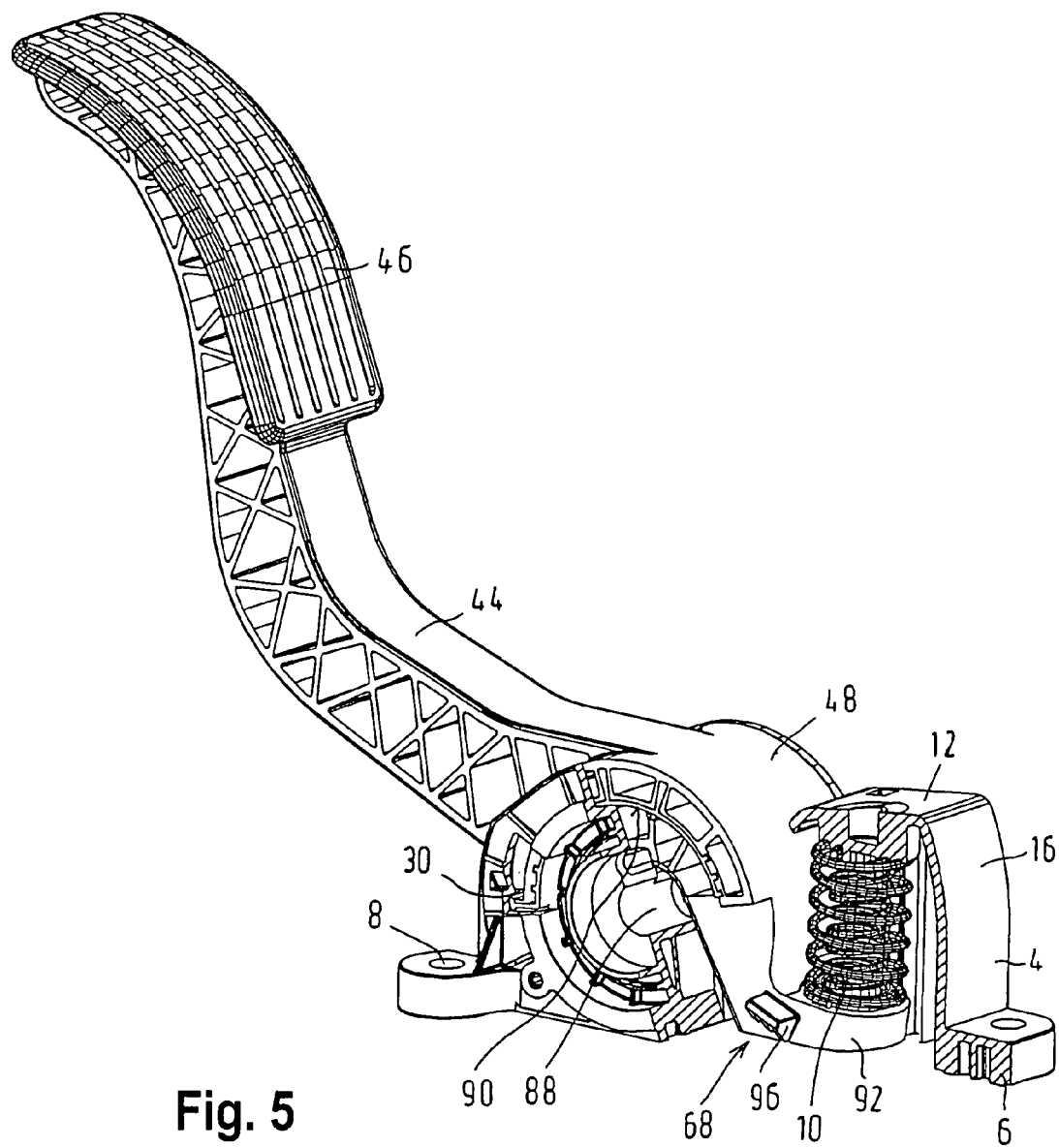
FIG. 5 is a fragmentary sectional view taken along the line V-V in FIG. 4.

In the second exemplary embodiment of the invention shown in FIGS. 4-6, the elements that remain the same and function the same as in the above example are identified by the same reference numerals. In a distinction from the first embodiment, the central bearing face of the bearing block 4 is formed by the radially outer circumferential surface 74 of a hollow peg 78 that is coaxial with the pivot axis 20 of the pivot connection and that is retained on a protrusion 80 protruding upward and away from the bottom plate 6, as can be best seen in FIG. 7. The hollow peg 78 extends between the cheeks 14 of the bearing block 4 and is freely accessible from above (FIG. 4) without being covered by a transverse wall. As in the exemplary embodiment described above, wedges 30 pointing toward one another are disposed on the cheeks 14, remote from the bearing face formed by the hollow peg 78. In the region of the wedges 30, the cheeks 14 have a relatively slight wall thickness, so that there is lateral resilience.

Besides the hollow peg 78, two further bearing faces are embodied on the bearing block 4, in the form of partly cylindrical faces 82 of larger diameter, only one of which is visible in FIG. 4, that each adjoin the associated cheek 14. A holder, in the form of a centering peg 84, for restoring spring elements 10, comprising two helical springs inserted into one another, is embodied in the crossbar 12 that in terms of the bearing block stops 30 is disposed on the far side of the hollow peg 78, and the ends of the helical springs are received on this peg 84, as FIG. 7 shows.

Figure 7:
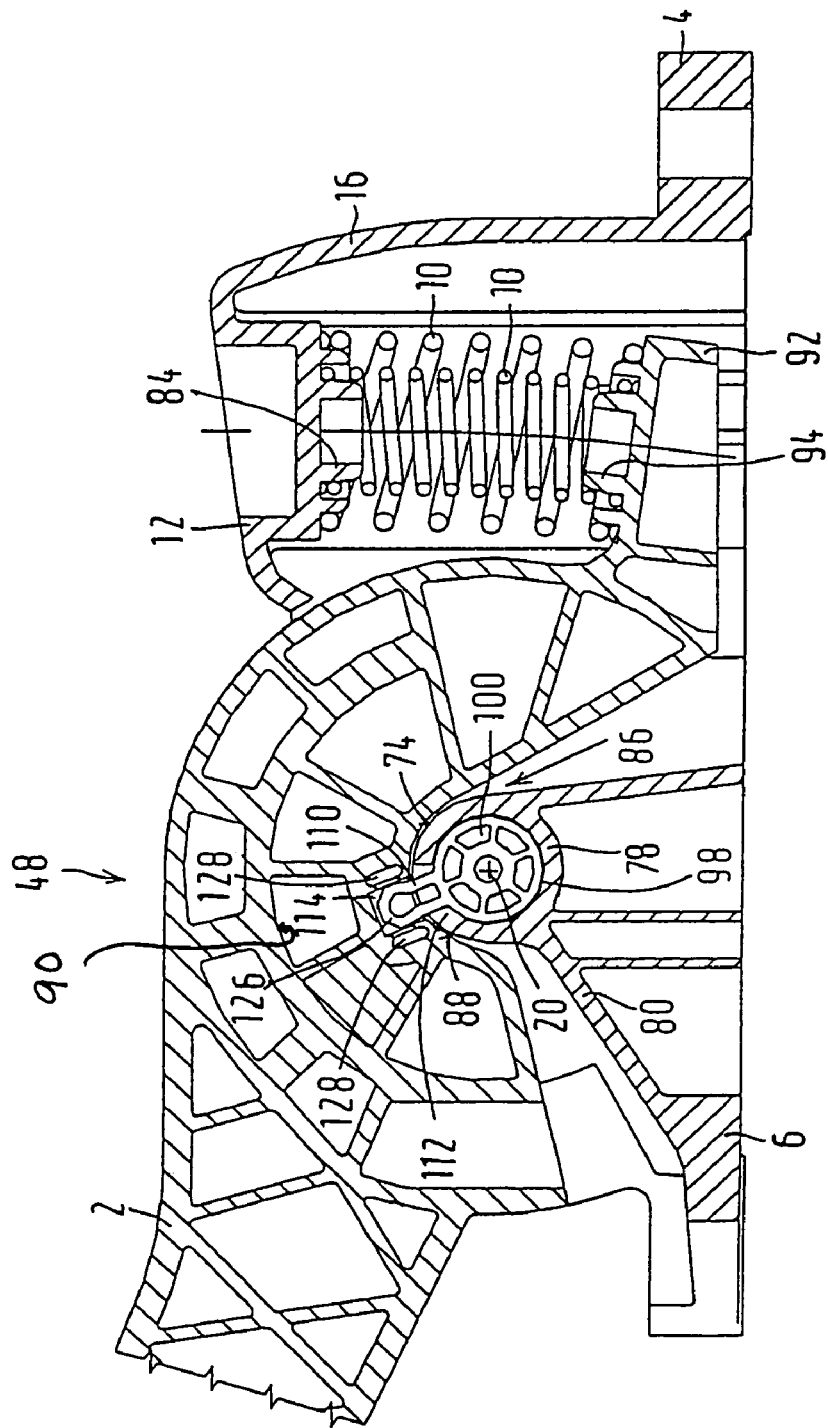
FIG. 7 is a longitudinal section through the accelerator pedal module of FIG. 4.

It can also be seen from FIG. 7 that the cylindrical pedal lever head 48 has a recess 86, which opens into a total of three, for instance, partly cylindrical bearing faces that are coaxial with the pivot axis 20. These bearing faces include a central bearing face 88 of the same diameter as the hollow peg 78, as well as one further bearing face 90 of greater diameter on each of their ends in terms of the axial direction; this latter diameter is equivalent to the diameter of the two outer bearing faces 82 of the bearing block 4. The pedal lever head 48 is also provided with an extension 92, extending in the longitudinal direction of the pedal lever, which has a holder for the restoring spring elements 10, which is in the form of a further centering peg 94, as best seen in FIG. 7. The laterally retracted region 60 of the pedal lever 2, which is defined by the stop edge 58, is also visible in FIG. 4.

For producing the pivot connection, the pedal lever 2 is placed with its three partly cylindrical bearing faces 88, 90 on the associated bearing faces 74, 82 of the bearing block 4, via the radial recess 86. Simultaneously, the restoring spring elements 10 are placed on the centering pegs 84, 94, which requires that the restoring spring elements be compressed. The compressive force generated because of the change in length of the restoring spring elements 10 assures that the pedal lever 2 is retained on the bearing block 4 and that the respective bearing faces 88, 90 and 74, 82 associated with one another are prestressed against one another. The stop edges 58 of the pedal lever 2 are in a position in which they have not yet moved past the wedges 30. From that position, the pedal lever 2 is now rotated counterclockwise, in terms of the view in FIG. 6, and the stop edges 58 slide along the ascending wedge faces 32 of the wedges 30, and the cheeks 14 deflect outward with elastic deformation. Once the stop edges 58 have moved past the steps 34 of the wedges 30, the cheeks 14 spring back inward, and the stop edges 58 engage the steps 34 of the wedges 30 from behind, as described in the preceding exemplary embodiment. The stop edges 58, together with the associated wedges 30, also form both the idling stop 66 of the accelerator pedal module 1 and a snap closure of the pivot connection that has come about because of the rotary motion. In FIG. 5, a wedge 96 can also be seen, which protrudes laterally away from the extension 92 of the pedal lever head 48 and strikes a stop, not shown, of the bearing block 4, in the full-load position of the pedal lever 2, and which as soon as the pedal lever 2 has been placed on the bearing block 4 is already in its working position without requiring a relative rotary motion for that purpose. The wedge 96 on the pedal lever 2 and the associated stop on the bearing block 4 together therefore form a full-load stop of the accelerator pedal module.

In both embodiments, the restoring spring elements 10 tense the bearing faces 18, 22, 50, 54 (FIGS. 1-3) and 74, 82, 88, 90 (FIGS. 4-7) that are associated with one another. Consequently, a frictional moment oriented counter to the actuation motion occurs in the pivot bearing, and this moment depends, among other factors, on the coefficient of friction of the bearing faces and on the diameter of the bearing faces. As a result, as in accelerator pedals with purely mechanical transmission means, a frictional hysteresis is generated, which has an advantageous effect on the road feel. Preferably, at least one of the bearing faces 18, 22, 50, 54 (FIGS. 1-3) and 74, 82, 88, 90 (FIGS. 4-7) are provided with a suitable friction lining, which can for instance be done in the production of the injection-molded part by placement in the mold, so that the friction lining is already integrated with the bearing face 18, 22, 50, 54 (FIGS. 1-3) and 74, 82, 88, 90 (FIGS. 4-7). Then the accelerator pedal module 1 of the embodiments described above comprises a total of only four different components, namely the pedal lever 2, the bearing block 4, the sensor 102, and the restoring spring elements 10.

The peg embodied as a hollow peg 78 is embodied integrally with the bearing block 4 and in particular with its bottom plate 6 and has a bearing bore 98, which is coaxial with the pivot axis 20, for a sensor shaft 100 of a rotation sensor 102, embodied preferably as a rotary potentiometer, in the form of a blind bore in which at least part of the sensor shaft 100 is directly supported rotatably, that is, without the interposition of bearing bushes, as can be seen from FIG. 7. Consequently, the axis of rotation of the sensor is coaxial with the pivot axis 20 of the pivot connection between the pedal lever 2 and the bearing block 4. Preferably, one end portion 104 of the sensor shaft 100 is received in the bearing bore 98, while the other end portion 106 of the sensor shaft 100 is rotatably supported in a sensor housing 108, secured to the bearing block 4 for instance by means of screws on the associated holder 40, as best seen in the exploded view of FIG. 4.

The sensor shaft 100 rotatably supported inside the hollow peg 78 and the pedal lever head 48 rotatably supported on the hollow peg 78 are directly coupled for rotation to one another by a driver 110, in order to transmit the rotary motions of the pedal lever 2 to the sensor shaft 100 essentially without play and in linear fashion. This can be achieved for instance by providing that a driver pin 110, protruding radially away from the sensor shaft 100, protrudes through a slot 112 in the wall of the hollow peg 78 and is received directly in a recess 114 in the central bearing face 88 of the pedal lever head 48. The slot 112 has a length in the circumferential direction that allows an unhindered motion of the pedal lever 2 between the idling stop 66 and the full-load stop. To enable the sensor lever 118 to be inserted laterally into the bearing bore 98 of the hollow peg 78 despite the driver pin 110 protruding radially away from it, the slot 112 extends in the direction of the pivot axis 20 as far as the end of the hollow peg 78 that is located opposite the sensor housing 108. Moreover, the cheek 14 of the bearing block 4 pointing toward the sensor housing 108 has a through hole 116 that is coaxial with the sensor shaft 100, so that by simple lateral insertion into the bearing bore 98, the sensor shaft 100 can be installed with simultaneous alignment of the driver pin 110 with the slot 112.

Protruding away from the sensor shaft 100 is a sensor lever 118, which is preferably integral with the sensor shaft and which is provided on its free end with wiper contacts 122 of a wiper 124 that are oriented toward a sensor plate 120. By rotation of the wiper 124 relative to the sensor plate 120, continuously variable resistance values can be set in a known manner.

The cross section of the driver pin 110 is preferably widened somewhat at its head 126, compared to its part that protrudes through the slot 112 of the wall of the hollow peg 78, with the head 126 engaging the recess 114 in the central bearing face 88 of the pedal lever head 48. This recess is preferably embodied by a radially extending blind bore 114, whose cross section is somewhat smaller than the cross section of the head 126 of the driver pin 110. The driver pin 110 is embraced in the recess 114 with prestressing whenever at least one side wall, for instance, of the blind bore 114 is capable of deforming elastically upon insertion of the driver pin 110. In the present case, two side walls, facing one another, of the blind bore 114 are double, forming one hollow space 128 each, as FIG. 7 shows. Then the side wall, which is preferably embodied as thin, of the blind bore 114 can yield laterally with elastic deformation, when the head 126, of widened cross section, of the driver pin 110 is inserted. It is understood that the driver pin 110 can be connected to the pedal lever 2 instead of to the sensor shaft 100 and can preferably be embodied integrally with it and received in a recess embodied in the sensor shaft 100.

The foregoing relates to preferred exemplary embodiments of the invention, it being understood that other variants and embodiments thereof are possible within the spirit and scope of the invention, the latter being defined by the appended claims.

I claim:

1. An accelerator pedal module (1) for controlling the power of a driving engine comprising,
   a bearing block (4) embodied as a one-piece molded part comprising a bearing region having a bearing bore (98) and at least one bearing face (82),
   a pedal lever (2) retained rotatably on said at least one bearing face (82) and being coaxial with a pivot axis (20) on the bearing block (4),
   a rotation sensor (102) having a sensor shaft (100) actuated by the pedal lever (2), the sensor shaft being coaxial with the pivot axis (20), and at least a part (104) of the sensor shaft (100) being directly supported rotatably in the bearing bore (98) of the bearing region of the bearing block (4), wherein at least part of a radial surface of said bearing region forms said at least one bearing face (82) for the pedal lever (2), wherein the bearing region is formed by a hollow peg (78) of the bearing block (4), the hollow peg being coaxial with the pivot axis (20) and further comprising at least one additional partly cylindrical outer surface (74, 82) of different diameter embodied on the radially outer surface of the hollow peg (78).

2. The accelerator pedal module according to claim 1, further comprising complementary bearing faces (88, 90) of the pedal lever (2) that are coaxial with the pivot axis (20) and partly cylindrical, and are associated with the bearing faces (74, 82) of the hollow peg (78).

3. The accelerator pedal module according to claim 2, further comprising a restoring spring system (10) for restoring the pedal lever (2) to an idling position, the restoring spring system (10) tensing the bearing faces (88, 90) of the pedal lever (2) against the bearing faces (74, 82) of the bearing block (4).

4. The accelerator pedal module according to claim 3, wherein the pedal lever (2) is guided between two cheeks (14) that are integral with the bearing block (4).

5. The accelerator pedal module according to claim 4, wherein the sensor shaft (100) is rotationally coupled directly to the pedal lever (2) by means of at least one driver (110) protruding radially through a wall of the hollow peg (78).

6. The accelerator pedal module according to claim 5, wherein one end (104) of the sensor shaft (100) is rotatably supported in the bearing bore (98) of the hollow peg (78), and the other end (106) of the sensor shaft is rotatably supported in a sensor housing (108) that is fixed on the bearing block (4).

7. The accelerator pedal module according to claim 6, wherein the driver (110) is embodied integrally with either the pedal lever (2) or the sensor shaft (100).

8. The accelerator pedal module according to claim 7, wherein the hollow peg (78) of the bearing block (4) comprises a slot (112), open toward the sensor housing (108), for the lateral introduction of the driver (110).

9. The accelerator pedal module according to claim 8, wherein the driver comprises a driver pin (110), embraced in a recess (114) in the pedal lever (2) or in the bearing block (4).

10. The accelerator pedal module according to claim 9, wherein the recess is formed by a blind bore (114), whose cross section is smaller than the cross section of the driver pin (110), at least one side wall of the blind bore being elastically deformable upon introduction of the driver pin (110).

* * * * *